US012785138B2

(12) United States Patent
Zeng

(10) Patent No.: US 12,785,138 B2
(45) Date of Patent: Nov. 3, 2026

(54) FLAT-PLATE SODIUM METAL BATTERY AND ELECTROCHEMICAL DEVICE

(71) Applicant: CONTEMPORARY AMPEREX TECHNOLOGY (HONG KONG) LIMITED, Hong Kong (CN)

(72) Inventor: Yuqun Zeng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 636 days.

(21) Appl. No.: 18/189,309

(22) Filed: Mar. 24, 2023

(65) Prior Publication Data

US 2023/0231180 A1 Jul. 20, 2023

Related U.S. Application Data

(63) Continuation of application No. PCT/CN2022/077901, filed on Feb. 25, 2022.

(30) Foreign Application Priority Data

Jun. 26, 2021 (CN) ......................... 202110742606.2

(51) Int. Cl.

| | |
|---|---|
| ***H01M 10/054*** | (2010.01) |
| ***H01M 4/02*** | (2006.01) |
| ***H01M 4/58*** | (2010.01) |
| ***H01M 4/583*** | (2010.01) |
| ***H01M 4/62*** | (2006.01) |
| ***H01M 4/80*** | (2006.01) |
| ***H01M 50/414*** | (2021.01) |

(52) U.S. Cl.

CPC ....... *H01M 10/054* (2013.01); *H01M 4/5825* (2013.01); *H01M 4/583* (2013.01); *H01M 4/622* (2013.01); *H01M 4/80* (2013.01); *H01M 50/414* (2021.01); *H01M 2004/021* (2013.01); *H01M 2004/027* (2013.01); *H01M 2004/028* (2013.01)

(58) Field of Classification Search

CPC ....................................................... H01M 4/80

See application file for complete search history.

(56) References Cited

U.S. PATENT DOCUMENTS

2010/0035150 A1* 2/2010 Ando ...................... H01M 4/70 429/209
2016/0028122 A1 1/2016 Zhamu et al.
2017/0309918 A1 10/2017 Roumi et al.
2018/0205077 A1* 7/2018 Park ...................... H01M 4/366
2019/0165374 A1 5/2019 Zhamu et al.
2020/0036034 A1* 1/2020 Wang ................. H01M 50/538

FOREIGN PATENT DOCUMENTS

| | | | |
|---|---|---|---|
| CN | 101645519 | A | 2/2010 |
| CN | 101867060 | A | 10/2010 |
| CN | 106030888 | A | 10/2016 |
| CN | 107148697 | A | 9/2017 |
| CN | 109037590 | A | 12/2018 |
| CN | 109155415 | A | 1/2019 |
| CN | 110021755 | A | 7/2019 |
| CN | 110660965 | A | 1/2020 |
| CN | 111244392 | A | 6/2020 |
| CN | 111525099 | A | 8/2020 |
| CN | 212182451 | U | 12/2020 |
| CN | 113437356 | A | 9/2021 |
| JP | 2010027368 | A | 2/2010 |
| JP | 2019505964 | A | 2/2019 |
| KR | 20170122134 | A | 11/2017 |
| WO | 2017020860 | A1 | 2/2017 |
| WO | 2020120967 | A1 | 6/2020 |

OTHER PUBLICATIONS

CN101867060 published on Oct. 20, 2010 (Year: 2010).*
Extended European Search Report for Application No. PCT/CN2022/077901, dated Feb. 6, 2024, 8 pages.
ISR for International Application PCT/CN2022/077901 mailed Apr. 28, 2022.
Written Opinion for International Application PCT/CN2022/077901 mailed Apr. 28, 2022.
First Chinese Office Action issued on counterpart application 202110742606.2 dated Oct. 20, 2021.
Notification to Grant issued on counterpart application 202110742606.2 dated Jan. 12, 2022.
Chinese office action dated Jul. 19, 2023 for Application No. 202210180644.8.

* cited by examiner

*Primary Examiner* — Brian R Ohara
(74) *Attorney, Agent, or Firm* — Ladas & Parry LLP

(57) ABSTRACT

A flat-plate type sodium metal battery and an electrochemical device are described. The battery comprises a positive electrode plate and a negative electrode plate, the positive electrode plate provided with a first micro-through-hole arranged in an array on at least part of the surface thereof, the negative electrode plate provided with a second micro-through-hole arranged in an array on at least part of the surface thereof, wherein the first micro-through-hole and the second micro-through-hole have an overlapping area of ≥5% of the total area of the second micro-through-hole of the negative electrode plate. Disposing a first micro-through-hole on the positive electrode plate, and a second micro-through-hole on the negative electrode plate, and setting the aperture size and aperture spacing of micro-through-holes are beneficial to increasing infiltration and penetration of the electrolyte in the positive electrode plate and are conducive to rapid infiltration to large-sized electrode plates.

10 Claims, No Drawings

FLAT-PLATE SODIUM METAL BATTERY AND ELECTROCHEMICAL DEVICE

CROSS-REFERENCE TO RELATED APPLICATION

This application is a continuation of PCT/CN2022/077901 filed on Feb. 25, 2022 that claims priority to Chinese Patent Application No. 202110742606.2 entitled "flat-plate sodium metal battery and electrochemical device" filed on Jun. 26, 2021. These applications are incorporated herein by reference in its entirety.

TECHNICAL FIELD

The present application relates to the technical field of battery and more particularly, to a flat-plate sodium metal battery and an electrochemical device.

BACKGROUND

With the increasing popularity of electric vehicles, the market has put forward higher and higher requirements for the cruising range, fast charging performance, service life and cost of electric vehicles. Among them, the cruising range of an electric vehicle is directly related to energy density of a vehicle battery pack, and further determined by energy density of an individual battery and its grouping efficiency (space utilization) in the battery pack. In order to further improve the grouping efficiency of the individual battery, the individual power battery shows a development trend towards large capacity/large volume. For example, in 2020, BYD announced a new "blade battery" technology. The length of an individual battery cell can reach 600 mm to 2500 mm and the grouping efficiency of a battery pack using the blade battery can be increased from 40% to 50% to a maximum of 65%, thereby significantly improving the energy density of the battery pack. However, the larger battery also brings huge challenges to battery cell processes, such as the application consistency of large electrode plates, the problem of electrolyte infiltration, the interface control of positive and negative electrode plates, the defects control and the like.

In addition, in order to further reduce the resource limitations and costs of power batteries and energy storage batteries, sodium-based battery technology with sodium as a core energy storage unit has received extensive attention in the industry. So far, sodium-ion batteries have excellent cycle performance and rate performance, and have become one of the powerful alternatives to the currently widely used lithium-ion batteries. However, the low energy density of sodium-ion batteries is still a bottleneck that limits its application and promotion. Replacing low-capacity sodium ion intercalation/de-intercalation negative electrode with a metallic sodium negative electrode can effectively improve the energy density of sodium batteries. At the same time, the development of sodium-based electrolytes has also enabled the growth of sodium dendrites and the resulting safety issues therefrom to be effectively controlled. Sodium metal batteries have industrial application prospects.

Therefore, at present, a sodium battery with a higher energy density and rate performance is urgently required to widen the application of sodium batteries in power battery and energy storage market.

SUMMARY

In view of this, in order to overcome above-mentioned defect, the application provides a flat type sodium metal battery and an electrochemical device, which effectively solves the problem of poor application consistency and poor infiltration that a large electrode plate battery exists, so that the sodium metal battery as obtained has the advantages of high energy density, high rate capability, high cycle efficiency and low cost.

In a first aspect, embodiments of the application provides a flat-plate type sodium metal battery, comprising a positive electrode plate and a negative electrode plate, the positive electrode plate provided with a first micro-through-hole arranged in an array on at least part of surface thereof, the negative electrode plate provided with a second micro-through-hole arranged in an array on at least part of surface thereof, wherein the first micro-through-hole and the second micro-through-hole have an overlapping area of ≥5% of the total area of the second micro-through-hole of the negative electrode plate.

In the above-mentioned technical solution, by arranging micro-through-holes on positive electrode plate and negative electrode plate, during the assembling process of battery, electrolyte evenly infiltrates battery cell and the wettability and permeability of electrolyte are improved, thereby realizing rapid infiltration on a large electrode plate and further improving the first coulombic efficiency and cycle performance of the battery cell. Meanwhile, in addition to infiltration in the horizontal direction of electrode plate/separator, the electrolyte can also quickly penetrate through the network formed by the preset micro-holes of the positive and negative electrode plates and the micro-holes in the separator along a vertical direction of the electrode plates, which effectively solves the problem of insufficient infiltration of the electrolyte on large-sized electrode plates.

Optionally, the first micro-through-hole has at least one of the following technical features:

(1) the first micro-through-hole has an aperture of from 1 μm to 100 μm;

(2) the first micro-through-hole is from 1 mm to 10 mm away from its adjacent first micro-through-hole;

(3) a ratio of an area of the first micro-through-hole to an area of the positive electrode plate is less than 1%.

Optionally, the second micro-through-hole has at least one of the following technical features:

(1) the second micro-through-hole has an aperture of from 1 μm to 20 μm;

(2) the second micro-through-hole is from 1 mm to 5 mm away from its adjacent second micro-through-hole;

(3) a ratio of an area of the second micro-through-hole to an area of the negative electrode plate is less than 0.1%.

Optionally, the positive electrode plate comprises a positive active material, and the positive active material is at least one of sodium transition metal oxide, polyanionic compound, and Prussian blue compound.

Optionally, the negative electrode plate comprises a porous current collector and a conductive coating coated on at least part of the surface of the porous current collector.

Optionally, the conductive coating has at least one of the following technical features:

(1) the conductive coating has a thickness of from 1 μm to 5 μm;

(2) a ratio of an area of the conductive coating to a pore area of the porous current collector is ≥20%;

(3) the conductive coating comprises a conductive agent and a binder, and the conductive agent is present in the conductive coating in a mass percentage content of from 10% to 80%;

(4) the conductive coating comprises a conductive agent and a binder, and the conductive agent comprises at least one of conductive carbon black, graphite, carbon fiber, single-walled carbon nanotubes, multi-walled carbon nanotubes, graphene, and fullerenes;

(5) the conductive coating comprises a conductive agent and a binder, and the binder is at least one of polyvinylidene fluoride, sodium carboxymethyl battery cellulose, styrene-butadiene rubber, sodium alginate, lithium polyacrylate, sodium polyacrylate, polytetrafluoroethylene, polyimide, and polyurethane.

Optionally, the battery further includes a separator and the separator has at least one of the following technical features:

(1) the separator comprises at least one of polypropylene microporous films, polyethylene microporous films, polyimide microporous films, and polyethylene terephthalate microporous films; and (2) the separator has a thickness of from 5 μm to 15 μm.

Optionally, the positive electrode plates and negative electrode plates are prepared by adopting any one of laser drilling and mechanical punching or the combination thereof.

Optionally, the battery has a battery cell is a flat-plate structure, the battery cell have a length and width of from 400 mm to 1600 mm, the battery cell has a thickness of from 10 mm to 40 mm, a ratio of the length and the width of the battery cell is (1.1~3.9):1, and a ratio of the length to the thickness of the battery cell is (10~150):1.

In a second aspect, embodiments of the present application provide an electrochemical device, comprising the battery described in the first aspect.

Beneficial effect of the application is:

(1) In the present application, disposing a first micro-through-hole on the positive electrode plate, and a second micro-through-hole on the negative electrode plate, and setting the aperture size and aperture spacing of micro-through-holes are beneficial to increasing infiltration and penetration of the electrolyte in the positive electrode plate and are conducive to rapid infiltration to large-sized electrode plates, while avoiding the problem of insufficient infiltration in the central local area due to capillary effect, thereby enabling the prepared sodium metal battery to have high energy density, rate performance and cycle efficiency, and low cost.

(2) In this application, a conductive coating is arranged on the surface of the negative electrode current collector to increase active sites on the surface of electrode plates, reduce overpotential required for sodium deposition, and facilitate uniform deposition of sodium on the surface of negative electrode plate.

(3) In this application, the length, width and thickness of the battery cells are set to make the battery cells in a flat-plate effect. When the battery cells are grouped, they can be stacked from bottom to top along a thickness direction of battery, which is beneficial to reduce the vibration impact of battery pack perpendicular to the bottom direction, and improve the structural stability of the battery/module under working conditions.

DETAILED DESCRIPTION

The following are the preferred embodiments of embodiments of the application. It should note that for those of ordinary skill in the art, some improvements and modifications can be made without departing from the principles of embodiments of the application, and these improvements and modifications should also be regarded as falling into the protection scope of embodiments of the present application.

The terms used in embodiments of the present application are only for the purpose of describing specific embodiments, and are not intended to limit the present application. As used in embodiments of this application and the appended claims, the singular forms "a", "an" and "the" are intended to include the plural forms as well, unless the context clearly dictates otherwise.

The application provides a flat-plate type sodium metal battery, the battery comprises at least one in soft pack battery, square aluminum shell battery, square steel shell battery, cylindrical aluminum shell battery and cylindrical steel shell battery, and the battery comprises a positive electrode plate and a negative electrode plate, the positive electrode plate provided with a first micro-through-hole arranged in an array on at least part of surface thereof, the negative electrode plate provided with a second micro-through-hole arranged in an array on at least part of surface thereof, wherein the first micro-through-hole and the second micro-through-hole have an overlapping area of ≥5% of the total area of the second micro-through-hole of the negative electrode plate.

In the above-mentioned technical solution, by arranging micro-through-holes on positive electrode plate and negative electrode plate, electrolyte evenly infiltrates battery cell and the wettability and permeability of electrolyte are improved during the assembling process of battery, thereby realizing rapid infiltration on a large electrode plate and further improving the first coulombic efficiency and cycle performance of the battery cell. Meanwhile, in addition to infiltration in the horizontal direction of electrode plate/separator, the electrolyte can also quickly penetrate through the network formed by the preset micro-holes of the positive and negative electrode plates and the micro-holes in the separator along a vertical direction of the electrode plates, which effectively solves the problem of insufficient infiltration of the electrolyte on large-sized electrode plates. The first micro-through-hole and the second micro-through-hole have an overlapping area of ≥5% of the total area of the second micro-through-hole of the negative electrode plate. Specifically, the first micro-through-hole and the second micro-through-hole have an overlapping area of 5%, 8%, 10%, 15%, 34%, 40%, 50%, 60%, 68%, 70%, and the like of the total area of the second micro-through-hole of the negative electrode plate, which is not limited thereto. If the overlapping area is less than 5%, the positive electrode plate and the negative electrode plate cannot be penetrated well, and the speed and efficiency of penetration will be negatively affected.

In an optional embodiment of the application, the first micro-through-hole has an aperture of from 1 μm to 100 μm. Specifically, the aperture of the first micro-through-hole can be 1 μm, 10 μm, 20 μm, 30 μm, 40 μm, 50 μm, 60 μm, 70 μm, 80 μm, 90 μm, 100 μm, and the like, which are not limited thereto. If the aperture of the micro-through-hole is less than 1 μm, it is difficult to control the punching technology for its accuracy, and it is difficult to achieve such an aperture; if the aperture of the micro-through-hole is greater than 100 μm, too much active material will lose, the capacity of the battery cell decreases significantly, the material utilization rate decreases and the cost increases. Based on this, a ratio of the area of the micro-through-hole to the area of the entire positive electrode is less than 1%. The first micro-through-hole is from 1 mm to 10 mm away from its adjacent first micro-through-hole. Specifically, the first micro-through-hole The first micro-through-hole can be 1 mm, 2 mm, 3 mm, 4 mm, 5 mm, 6 mm, 7 mm, 8 mm, 9 mm, 10 mm, and the like, away from its adjacent first micro-through-hole, which are not limited thereto. The spacing of the micro-through-holes is set within the above range to ensure that the large-sized electrode plate has a sufficient infiltration effect after a dry battery cell obtained by winding/lamination is injected with electrolyte. In the present application, by disposing a micro-through-hole array on the surface of the positive electrode plate, it is beneficial to increase the wettability and permeability of electrolyte in the positive electrode plate, which is conducive to rapid infiltration to large-sized electrode plates while avoiding the problem of insufficient infiltration in the central local area due to capillary effect.

In an optional embodiment of the application, the negative electrode current collector surface of the battery cell is provided with a second micro-through-hole arranged in an array wherein the second micro-through-hole has an aperture of from 1 μm to 20 μm. Specifically, the aperture of the second micro-through-hole can be 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, and the like, which is not limited thereto. If the aperture of the second micro-through-hole is less than 1 μm, it is difficult to control the punching technology for its accuracy, and it is difficult to achieve such an aperture; if the aperture of the second micro-through-hole is greater than 20 μm, during the charging process of battery cell, a large amount of sodium released from the positive electrode area corresponding to the hole will be deposited around the wall of the holes on the negative electrode, resulting in significantly uneven sodium deposition in the micro-through-hole area, and sodium tips or sodium dendrites is easily formed, resulting in intensified side reactions with electrolyte and reduced the first Coulomb efficiency and cycle performance of battery cells. In severe cases, there is a safety risk of an internal short circuit. Based on this, a ratio of the area of the second micro-through-hole to the area of the entire negative electrode plate is less than 0.1%. Based on the limitation of the upper limit of the aperture on the negative current collector, spacing of the second micro-through-holes is set between 1 mm and 5 mm to ensure that the large-sized electrode plate has a sufficient infiltration effect after a dry battery cell obtained by winding/lamination is injected with electrolyte. In the present application, by disposing a second micro-through-hole array on the surface of the negative electrode plate, it is beneficial to increase the wettability and permeability of electrolyte in the negative electrode plate, which is conducive to rapid infiltration to large-sized electrode plates while avoiding the problem of insufficient infiltration in the central local area due to capillary effect.

Optionally, the positive electrode plate and negative electrode plate are prepared by adopting any one of laser drilling and mechanical punching or the combination thereof. The laser drilling is preferred to enable the aperture to be controlled precisely. The negative electrode plate may be prepared by directly perforating a current collector followed by applying a conductive coating, or may be prepared by carrying out a perforation treatment on a coated current collector. It is preferred to perforate a current collector first, and then apply a conductive coating to obtain better adhesion of the conductive coating at the holes channel. There is no limitation to the direction of perforation. The holes can be perforated vertically or obliquely along the current collector as long as it is sufficient to ensure that the overlapping area of the first micro-through-hole and the second micro-through-hole is not less than 5% of the total area of the second micro-through-hole of the negative electrode plate.

In an optional embodiment of this application, the positive electrode plate comprises a positive active material, and the positive active material is at least one of sodium transition metal oxide, polyanionic compound, and Prussian blue compound. In the sodium transition metal oxide, the transition metal can be one or more of Mn, Fe, Ni, Co, Cr, Cu, Ti, Zn, V, Zr and Ce. The sodium transition metal oxide is, for example, $Na_xMO_2$, where M is one or more of Ti, V, Mn, Co, Ni, Fe, Cr and Cu, and $0<x\leq1$. The polyanionic compound comprises one or more of sodium vanadium trifluorophosphate ($Na_3V_2(PO_4)_2F_3$), sodium vanadium fluorophosphate ($NaVPO_4F$), sodium vanadium phosphate ($Na_3V_2(PO_4)_3$), $Na_4Fe_3(PO_4)_2P_2O_7$, $NaFePO_4$, and $Na_3V_2(PO_4)_3$. The Prussian blue compound is $NaxM^1M^2(CN)_6$, wherein $M^1$ and $M^2$ are one or more of Fe, Mn, Co, Ni, Cu, Zn, Cr, Ti, V, Zr, and Ce, and wherein $0<x\leq2$.

The positive active material can further comprises a binder and/or a conductive agent. There is no limitation to the type of the binder and conductive agent, and those skilled in the art can make a choice according to actual demand. For example, the above-mentioned binder may be one or more of polyvinylidene fluoride (PVDF), polytetrafluoroethylene (PTFE), polyacrylic acid (PAA), polyvinyl alcohol (PVA), and styrene-butadiene rubber (SBR). The above-mentioned conductive agent can be one or more of graphite, superconducting carbon, acetylene black, carbon black, carbon nanotube, graphene and carbon nanofiber.

In an optional embodiment of this application, the negative electrode plate comprises a porous current collector and a conductive coating applied on at least part of surface of the porous current collector. Since there is no active material on the surface of the negative electrode, the active sodium is deposited in-situ by the first charging of the positive electrode. By applying the conductive coating on the porous current collector, the active sites on the surface of the electrode plates can be increased and the overpotential required for sodium deposition can be reduced so that it is beneficial to uniform deposition of sodium on the surface of the negative electrode. The conductive coating has a thickness of from 1 μm to 5 μm. Specifically, the thickness of the conductive coating can be 1 μm, 2 μm, 3 μm, 4 μm, 5 μm, and the like, which is not limited thereto. If the thickness of the conductive coating is less than 1 μm, it is difficult for the conductive layer to have good uniform coverage and thickness consistency. If the thickness of the conductive coating is greater than 5 μm, some volume energy density will be lost. In the present application, by providing a conductive coating on the surface of the porous current collector, active sites on the surface of electrode plates can be increased, overpotential required for sodium deposition can be reduced, and it is beneficial to uniform deposition of sodium on the surface of the negative electrode. Further, by further setting a ratio of an area of the conductive coating to an area of the holes of the porous current collector is greater than or equal to 20%, active sites for sodium deposition in the holes channel of the electrode plate may be increased and the uniformity of sodium deposition in the holes channel may be improved.

In an optional embodiment of this application, the conductive coating comprises a conductive agent and a binder, and the conductive coating comprises a conductive agent and a binder, and the conductive agent comprises at least one of conductive carbon black, graphite, carbon fibers, single-walled carbon nanotubes, multi-walled carbon nanotubes, graphene, and fullerenes. Preferably, in the application, single-walled carbon nanotubes is used as a conductive agent to obtain better conductivity and wrapping of holes.

The binder comprises at least one of polyvinylidene fluoride, sodium carboxymethyl battery cellulose, styrene-butadiene rubber, sodium alginate, lithium polyacrylate, sodium polyacrylate, polytetrafluoroethylene, polyimide, and polyurethane. The binder can increase adhesion between the conductive coating and the porous current collector. The conductive agent is present in the conductive coating in a mass percentage content of from 10% to 80%. The content of the conductive agent is controlled within the above range, so as to ensure that the conductive coating has better conductivity to reduce overpotential for sodium deposition.

The conductive coating is prepared as follows. According to a preset ratio, a binder and a conductive agent are added in water as a solvent and stirred evenly for 6-8 hours to obtain a conductive slurry. By controlling the content of water, viscosity of the conductive slurry is controlled as to be ≥6000 mPa·s so as to promote the conductive coating to have a larger coverage area in the holes region of current collector. A gravure primer coater is used to apply the conductive slurry on the perforated current collector and the applied slurry is dried to obtain the conductive coating.

In an optional embodiment of the application, the battery further comprises a separator, the separator is arranged between the positive electrode plate and the negative electrode plate for preventing short circuit between positive and negative electrodes, and the separator comprises at least one of polypropylene microporous film, polyethylene microporous film, polyimide microporous film, and polyethylene terephthalate microporous film. The separator has a thickness of from 5 μm to 15 μm. Specifically, the thickness of the separator can be 5 μm, 6 μm, 7 μm, 8 μm, 9 μm, 10 μm, 11 μm, 12 μm, 13 μm, 14 μm, 15 μm, and the like, which is not limited thereto. Controlling the thickness within the above range can ensure insulation properties and mechanical strength of the separator, and can ensure rate characteristics and energy density of electrochemical devices.

Further, the battery of the present application further comprise an electrolyte, and the electrolyte comprises a sodium salt and an organic solvent. Specifically, there is no particular limitation to the organic solvent in the electrolyte, and the organic solvent may be an organic solvent commonly used in the electrolyte in the art. As an example, the organic solvent may be at least one selected from ethylene carbonate, propylene carbonate, diethyl carbonate, dimethyl carbonate, ethyl methyl carbonate, propylene carbonate, methyl acetate, ethyl propionate, fluoroethylene carbonate, ethyl ether, diglyme, triethylene glycol dimethyl ether, tetraethylene glycol dimethyl ether, and methyl tert-butyl ether. Preferably, ether solvents are used to adjust deposition morphology of sodium ions, thereby inhibiting massive growth of sodium dendrites. In the electrochemical device of the present application, there is no particular limitation to the sodium salt in the electrolyte, and the sodium salt may be a sodium salt commonly used in the electrolyte. As an example, the sodium salt may be at least one selected from sodium hexafluorophosphate, sodium bisfluorosulfonimide, sodium bistrifluoromethanesulfonimide, sodium trifluoromethanesulfonate, sodium tetrafluoroborate, sodium difluorophosphate, sodium perchlorate and sodium chloride.

In an optional embodiment of the application, the battery cell have a length and width of from 400 mm to 1600 mm, the battery cell has a thickness of from 10 mm to 40 mm, a ratio of the length and the width of the battery cell is (1.1~3.9):1, and a ratio of the length to the thickness of the battery cell is (10~150):1. According to above-mentioned setting of length, width and thickness of the battery cells, the battery cells are in a flat-plate structure. During the grouping process of battery cells, they can be stacked from bottom to top along a thickness direction of battery, which is beneficial to reduce the vibration impact of battery pack perpendicular to the bottom direction, and improve the structural stability of the battery/module under working conditions. The length and width of the battery cells are in the range of 400~1600 mm, so that the individual battery cell has a reasonable match with the commonly used vehicle battery pack and in combination with the specific electric vehicle design requirements, 1-n (n≤6) pieces of the flat-plate battery cells can be arranged along a horizontal direction of battery pack, making the grouping efficiency of battery cells as high as possible. The battery width of less than 1600 mm is related to the production and processing width of the existing coating equipment for electrode plate. The length-to-width ratio of battery is related to the production and processing width of the existing winding equipment for battery cell electrode plate, specifically, to the size of winding core. The ratio of the length to thickness of the battery cell is set to limit the thickness of battery cell to ≤40 mm so as to ensure that heat can be dissipated effectively from battery cell along its flat surface and cycle performance degradation caused by excessive temperature rise inside the battery cell may be avoided.

Embodiments of the present application further provide an electrochemical device, comprising the battery described in the first aspect. The electrochemical device of the present application comprises any device in which an electrochemical reaction occurs, specific examples of which comprise all kinds of primary batteries, secondary batteries, fuel battery cells, solar battery cells or capacitors, and the electrochemical device is a sodium metal battery. There is no particular limitation to the use of the electrochemical device of the present application, and it can be used in any electronic device known in the art. In some embodiments, the electrochemical devices of the present application may be used for notebook computers, pen input computers, mobile computers, e-book players, portable telephones, portable fax machines, portable copiers, portable printers, head-mounted stereos headphones, VCRs, LCD TVs, portable cleaners, portable CD players, mini discs, transceivers, electronic notepads, calculators, memory cards, portable recorders, radios, rackup power, motors, automobiles, motorcycles, power-assisted bicycles, bicycles, lighting equipment, toys, game consoles, clocks, power tools, flashlights, cameras, large batteries for household use, energy storage and sodium ion capacitors, and the like, without limitation thereto.

According to the shell size of flat-plate battery cell having a length, width and height of 800 mm, 400 mm and 12 mm respectively, a full battery is designed and prepared to further evaluate the technical effect of the application in terms of electrolyte infiltration and electrical performance, wherein the design capacity of the battery cell is 512 Ah.

Example 1

(1) Preparation of positive electrode: $Na_4Fe_3(PO_4)_2P_2O_7$ material was used for a positive electrode (gram capacity 120 mAh/g), polyvinylidene fluoride (PVdF) was used as a binder, and conductive carbon black (Super-P) was used as a conductive agent. $Na_4Fe_3(PO_4)_2P_2O_7$, PVdF and Super-P were mixed in N-methylpyrrolidone (NMP) as a solvent at a mass ratio of 96%:2%:2% uniformly to prepare a positive electrode slurry. An extrusion coater was used to apply the positive slurry on the surface of an aluminum foil in a positive active material mass per unit area of 30 mg/cm$^2$ and the applied slurry was dried, and then the coated electrode plate was subjected to cold pressing in a design compression density of 2.5 g/cm$^3$ with a cold press.

(2) Preparation of negative electrode: a perforated aluminum foil with a thickness of 12 μm was used as a negative electrode current collector, and the negative electrode current collector was coated with a conductive coating on the surface thereof. A gravure primer coater was used to apply the conductive slurry on the perforated current collector and the applied slurry was dried to obtain the final negative electrode plate. The prepared cold-pressed electrode plate was subjected to a laser perforation treatment. The aperture and spacing of holes of the negative electrode plate for each example were shown in Table 1.

(3) Preparation of electrolyte: $NaPF_6$ was dissolved in a mixed solvent of diglyme/tetraethylene glycol dimethyl ether by volume 1:1 in a concentration of 1 mol/L to obtain electrolyte.

(4) Battery assembly: the prepared positive and negative electrode plates and separator were cut into corresponding sizes and were wound into a dry battery cell by winder, and then through welding, packaging with an aluminum plastic film, liquid injection, chemical formation, pumping, secondary packaging, capacity testing and other standard processes, a soft-packed sodium metal battery was prepared. Among them, the electrolyte is injected in a calculated amount of 4 g/Ah.

Examples 2-5 and Comparative Examples 1-2

These examples were the same as example 1 with exception that the aperture of the first micro-through-holes of positive electrode was adjusted.

Examples 6-7 and Comparative Examples 3-4

These examples were the same as example 1 with exception that the spacing between two adjacent first micro-through-holes of positive electrode was adjusted.

Example 8-10 and Comparative Example 5-6

These examples were the same as example 1 with exception that the aperture of the second micro-through-holes of negative electrode was adjusted.

Example 11-12 and Comparative Example 7-8

These examples were the same as example 1 with exception that the spacing between two adjacent second micro-through-holes of negative electrode was adjusted.

Comparative Example 9

The example was the same as example 1 with exception that the positive and negative electrodes were not perforated and the battery was directly assembled. In order to improve infiltration of the electrode plate, the electrolyte was injected in a calculated amount of 5 g/Ah.

Comparative Example 10

The example was the same as example 1 with exception that the negative electrode was not perforated and the battery was directly assembled. In order to improve infiltration of the electrode plate, the electrolyte was injected in a calculated amount of 5 g/Ah.

Comparative Example 11

The example was the same as example 1 with exception that the positive electrode was not perforated and the battery was directly assembled. In order to improve infiltration of the electrode plate, the electrolyte was injected in a calculated amount of 5 g/Ah.

The prepared cold-pressed electrode plates were subjected to a laser perforation treatment. The aperture and spacing of holes on the positive and negative electrode plates for each example and comparative example were shown in Table 1.

TABLE 1

The data of holes on the positive and negative electrode plates for each example and comparative example.

| | Positive electrode | | | Negative electrode plate | | |
|---|---|---|---|---|---|---|
| No. | Hole Aperture (μm) | Hole Spacing (mm) | Hole Area Percentage (%) | Hole Aperture (μm) | Hole Spacing (mm) | Hole Area Percentage (%) |
| Example 1 | 50 | 5 | 0.007850% | 10 | 3 | 0.000872% |
| Example 2 | 1 | 5 | 0.000003% | 10 | 3 | 0.000872% |
| Example 3 | 20 | 5 | 0.001256% | 10 | 3 | 0.000872% |
| Example 4 | 80 | 5 | 0.020096% | 10 | 3 | 0.000872% |
| Example 5 | 100 | 5 | 0.031400% | 10 | 3 | 0.000872% |
| Example 6 | 50 | 1 | 0.196250% | 10 | 3 | 0.000872% |
| Example 7 | 50 | 10 | 0.001963% | 10 | 3 | 0.000872% |
| Example 8 | 50 | 5 | 0.007850% | 1 | 3 | 0.000009% |
| Example 9 | 50 | 5 | 0.007850% | 5 | 3 | 0.000218% |
| Example 10 | 50 | 5 | 0.007850% | 20 | 3 | 0.003489% |
| Example 11 | 50 | 5 | 0.007850% | 10 | 1 | 0.031400% |
| Example 12 | 50 | 5 | 0.007850% | 10 | 5 | 0.000388% |
| Comparative Example 1 | 0.8 | 5 | 0.000002% | 10 | 3 | 0.000872% |
| Comparative Example 2 | 102 | 5 | 0.032669% | 10 | 3 | 0.000872% |
| Comparative Example 3 | 50 | 0.8 | 0.306641% | 10 | 3 | 0.000872% |
| Comparative Example 4 | 50 | 11 | 0.001622% | 10 | 3 | 0.000872% |

TABLE 1-continued

The data of holes on the positive and negative electrode plates for each example and comparative example.

| No. | Positive electrode Hole Aperture (μm) | Positive electrode Hole Spacing (mm) | Positive electrode Hole Area Percentage (%) | Negative electrode plate Hole Aperture (μm) | Negative electrode plate Hole Spacing (mm) | Negative electrode plate Hole Area Percentage (%) |
|---|---|---|---|---|---|---|
| Comparative Example 5 | 50 | 5 | 0.007850% | 0.8 | 3 | 0.000006% |
| Comparative Example 6 | 50 | 5 | 0.007850% | 21 | 3 | 0.003847% |
| Comparative Example 7 | 50 | 5 | 0.007850% | 10 | 0.8 | 0.012266% |
| Comparative Example 8 | 50 | 5 | 0.007850% | 10 | 6 | 0.000218% |
| Comparative Example 9 | \ | \ | \ | \ | \ | \ |
| Comparative Example 10 | 50 | 5 | 0.007850% | \ | \ | \ |
| Comparative Example 11 | \ | \ | \ | 10 | 3 | 0.000872% |

Performance Test:

(1) Electrolyte Infiltration of Battery Cell

After injection, the battery cells were allowed to standing for different periods. And then a first charge was performed, and each battery was charged to 3.65V at a current of 0.1 C (51.2 A). It was disassembled in a drying room, observing whether a large area of negative electrode plate exhibited silver-white due to sodium deposition. Insufficient infiltration was indicated if there was a black area due to exposure of the primer, if not, complete infiltration was indicated and the minimum time required for the complete infiltration was recorded. A group was set for each additional half hour of infiltration time, and three battery cells were disassembled for each group for judgment and the three battery cells must meet the complete infiltration standard at the same time.

(2) Capacity and Cycle Performance of Battery Cell

A battery tester was used to conduct a charge-discharge test on battery cells to evaluate their electrochemical performance. The charge-discharge voltage was set to 2.5 V-3.65V, and the charge-discharge current was set to 512 A (1 C). The corresponding battery cell capacity was read when the battery cell was discharged from 3.65V to 2.5V after the first charge and discharge and after 200 cycles of charge and discharge. The average value of the three battery cell capacities was taken as a battery cell capacity value of each example. The capacity retention after the battery cell was subjected to 200 cycles was calculated by the following formula:

$$\text{capacity retention after 200 cycles} = \frac{\text{discharge capacity at the } 200th \text{ cycle}}{\text{discharge capacity at the first cycle}} * 100\%$$

The complete infiltration time, battery cell capacity and capacity retention after 200 cycles for each full battery of examples and comparative examples were shown in Table 2.

TABLE 2

Complete infiltration time, battery cell capacity and capacity retention after 200 cycles for each full battery of examples and comparative examples

| No. | Complete infiltration time | Battery cell capacity Ah | Capacity retention after 200 cycles |
|---|---|---|---|
| Example 1 | 14 h | 510.4 | 86.3% |
| Example 2 | 58 h | 510.8 | 81.20% |
| Example 3 | 44 h | 510.7 | 82.30% |
| Example 4 | 12 h | 509.7 | 86.50% |
| Example 5 | 11 h | 509.1 | 86.70% |
| Example 6 | 8 h | 500.6 | 87.40% |
| Example 7 | 42 h | 510.7 | 82.50% |
| Example 8 | 52 h | 510.4 | 81.60% |
| Example 9 | 28 h | 510.4 | 84.80% |
| Example 10 | 10 h | 510.2 | 86.90% |
| Example 11 | 7 h | 508.8 | 87.70% |
| Example 12 | 24 h | 510.4 | 83.60% |
| Comparative Example 1 | 103 h | 510.8 | 77.40% |
| Comparative Example 2 | 10 h | 508.7 | 79.60% |
| Comparative Example 3 | 6 h | 494.9 | 79.80% |
| Comparative Example 4 | 62 h | 508.0 | 77.20% |
| Comparative Example 5 | 98 h | 510.4 | 78.30% |
| Comparative Example 6 | 9 h | 510.2 | 71.40% |
| Comparative Example 7 | 8 h | 509.8 | 79.50% |
| Comparative Example 8 | 34 h | 510.4 | 76.3% |
| Comparative Example 9 | >120 h (insufficient infiltration) | 388.2 | 72.1% |
| Comparative Example 10 | >120 h(insufficient infiltration) | 412.8 | 74.4% |
| Comparative Example 11 | >120 h(insufficient infiltration) | 402.5 | 75.8% |

By comparing Example 1 with Comparative Examples 9-11, it can be known that infiltration of large-size flat-panel battery can be significantly improved by perforating the positive and negative electrode plates both. When a non-perforated electrode plate (Comparative Example 9) is used or a positive or negative electrode plate alone is perforated (Comparative Example 10, 11), even if more electrolyte is injected (the injection coefficient is increased from 4.0 g/Ah to 5.0 g/Ah), the battery cell cannot achieve the effect of complete infiltration even after it is left standing for 120 hours. The lack of electrolyte in local area impedes the release of sodium in the positive electrode, resulting in a significantly lower capacity of battery cell than its theoretical capacity; and further aggravates non-uniform sodium deposition in the interface of infiltration/non-infiltration area, and the side reaction of electrolyte, resulting in a simultaneous decline in terms of the cycle performance of battery. In the present application, by perforating the positive and negative electrode plates, the electrolyte can penetrates into the battery cell not only in a horizontal direction of the electrode plate/separator but also vertically through a microporous network formed by holes of the perforated electrode plates and pores of the separator, so that the infiltration time of the flat-plate battery is significantly shortened, the capacity of the battery cell can be exerted normally, and a good cycle stability is maintained.

By comparing Examples 1, 6, 7, 11, and 12 and Comparative Examples 3, 4, 7 and 8, the effect of the hole spacing of the positive and negative electrode on battery cell complete infiltration time and electrical performance can be seen. By comparing Examples 1, 2-5, 8-10 and Comparative Examples 1, 2, 5, and 6, the effect of the hole aperture of the positive and negative electrode on battery cell complete infiltration time and electrical performance can be seen. Within the scope of the present application, the hole spacing in Examples 6, 1 and 7 and in Examples 11, 1 and 12 gradually increase, and thus the number of holes is appropriate, which can ensure that the dry battery cell has a sufficient infiltration effect after liquid injection and that the cycle performance of the battery cell is increased. Within the scope of the present application, the hole aperture of the electrode plates in Examples 1 and 2-5 and in Examples 1 and 8-10 gradually increase, and the infiltration performance of the sodium metal battery gradually improves. The aperture is set within the above range, which can greatly shorten the complete infiltration time, ensure that the capacity of battery cell can be fully utilized and a better cycle performance can be obtained. The hole spacing of Comparative Examples 3 and 7 is smaller than the range of the present application. The hole spacing is smaller, there are more holes in the electrode plates, and the holes area becomes larger. Although the complete infiltration time of battery cell is shortened, the capacity of battery is impacted significantly and the capacity of battery cell is lower. The hole spacing of Comparative Examples 4 and 8 is larger than the range of the present application, and the number of holes contained in the electrode plate gradually decreases, so that the ability of the microporous network in the battery cell to transport electrolyte decreases, and the complete infiltration time of the battery cell extended, thereby affecting transport of sodium ions in local region, and enabling the cycle performance of the battery cell to decline to a certain extent. When the hole apertures of the positive electrode and the negative electrode are too small (Comparative Examples 1 and 5), it is not conducive to the penetration and transmission of electrolyte between the electrode plates through the holes, and the effect of improving the infiltration of the battery cell is not significant. When the hole aperture of the positive electrode is too large (Comparative Example 2), it will have a greater impact on energy density of the battery cell while mechanical properties of the electrode plate will decrease. The deformation and distortion of the electrode plate due to stress during charge and discharge process will be larger, which is not conducive to the cycle performance of the battery cell. When the hole aperture of the negative electrode is too large (Comparative Example 6), the hole channel is difficult to be covered by the conductive agent of the conductive coating, enabling uneven sodium deposition around the conductive hole to be aggravated, and side reactions with the electrolyte to increase. Meanwhile, the issue of insufficient mechanical properties of the electrode plate still exist and the cycle performance of the battery cell decreased significantly.

To sum up, by adopting the perforated positive and negative electrode plates to construct a vertical microporous transmission network of electrolyte, infiltration performance of a large-size flat-plate sodium metal battery can be greatly improved, complete infiltration time is greatly shortened, and the battery cell can be ensured to fully exert its capacity and to have better cycle performance.

In order to illustrate the technical effect of a conductive coating in the application, button-type sodium batteries and full batteries with different conductive coatings have been prepared.

Example 13

(1) Preparation of electrode plate: a perforated aluminum foil with a thickness of 12 μm was used as a current collector of negative electrode for sodium battery wherein the hole aperture was 10 μm, and the hole spacing was 3 mm. The perforated aluminum foil can be prepared by laser drilling or mechanical punching, and the current collector was coated with a conductive coating on the surface thereof. In the conductive coating, styrene-butadiene rubber (SBR), and sodium carboxymethyl battery cellulose (CMC) were used as a binder, Super-P carbon black was used as a conductive agent, and the ratio of SBR:CMC:Super-P carbon black was 20%:20%:60%. The conductive slurry was obtained by adding the binder and conductive agent into water as a solvent with stirring for 6-8 hours. By controlling the content of water, viscosity of the conductive slurry was controlled as to be ≥6000 mPa·s so as to promote the conductive coating to have a larger coverage area in the holes region of current collector. (The proportion of the hole area covered by a conductive agent was shown in Table 3). A gravure primer coater was used to apply the conductive slurry on the perforated current collector and the applied slurry was dried to obtain the final negative electrode plate. The conductive coating had a thickness of 3 μm.

(2) Assembly of button battery: A puncher was used to punch the negative electrode plate into a small disc with an aperture of 14 mm. In a drying room, the small disc as a negative electrode, a separator (Celgard2300 model), a sodium plate (16 mm in aperture) and a button battery case were assembled into a button half-battery cell, in which an electrolyte formed by dissolving $NaPF_6$ in a mixed solvent of diethylene glycol dimethyl ether/tetraethylene glycol dimethyl ether in a volume ratio of 1:1 with a concentration of 1 mol/L was added dropwise. Finally, a button-type battery packer is used for package to obtain a button-type half-battery cell.

Example 14

The example was the same as example 13 with exception that the conductive agent was carbon fiber.

Example 15

The example was the same as example 13 with exception that the conductive agent was multi-wall carbon nanotube.

Example 16

The example was the same as example 13 with exception that the conductive agent was single-wall carbon nanotube.

Example 17

The example was the same as example 13 with exception that the conductive coating had a thickness of 1 μm.

Example 18

The example was the same as example 13 with exception that the conductive coating had a thickness of 5 μm.

Comparative Example 12

The perforated aluminum foil was used as a negative electrode for assembly of button battery.

Comparative Example 13

The example was the same as example 13 with exception that the viscosity of the conductive slurry is less than or equal to 2000 mPa·s, so that the proportion of the hole area covered by a conductive agent in the final perforated negative electrode is lower.

Comparative Example 14

The example was the same as example 13 with exception that the conductive coating had a thickness of 0.5 m.

Comparative Example 15

The example was the same as example 13 with exception that the conductive coating had a thickness of 6 μm.

Performance Test:

(1) The Proportion of the Hole Area Covered by a Conductive Agent

A CCD camera was used to take picture to the perforated electrode plate of above-mentioned examples/comparative examples. The area not covered by a conductive agent in 10 perforated points were measured and taken its average. By comparing with the perforated area that calculates with standard perforated aperture, the proportion of the hole area covered by a conductive agent was calculated by the following formula:

$$\text{proportion of the hole area covered by a conductive agent} = \left\{1 - \frac{\text{the hole area covered by a conductive agent}}{3.14 * \left(\frac{\text{perforated aperture}}{2}\right)^2}\right\} * 100\%$$

Measurement of Overpotential for Sodium Deposition

A battery charge-discharge instrument was used to carry out a discharge test of button battery. The discharge voltage of the button battery was set to −100 mV vs Na/Na+, and the current density was set to 1 mA/cm$^2$. The lowest point of voltage in a capacity-voltage discharge curve was read, which was the overpotential of the sodium deposition on the negative electrode plate. The values were shown in Table 3.

TABLE 3

Conductive coating performance of each example and comparative example

| No. | Negative Electrode: Type of conductive agent | Aperture μm | Spacing mm | Hole Area Percentage | Hole Area Percentage covered by conductive agent | Thickness of conductive coating (μm) | Deposition overpotential mV |
|---|---|---|---|---|---|---|---|
| Ex. 13 | Super P carbon black | 10 | 3 | 0.000872% | 39% | 3 | 20 |
| Ex. 14 | Carbon fiber | 10 | 3 | 0.000872% | 45% | 3 | 18 |
| Ex. 15 | Multi-wall carbon nanotube | 10 | 3 | 0.000872% | 51% | 3 | 16 |
| Ex. 16 | Single-wall carbon nanotube | 10 | 3 | 0.000872% | 68% | 3 | 12 |
| Ex. 17 | Super P carbon black | 10 | 3 | 0.000872% | 39% | 1 | 21 |
| Ex. 18 | Super P carbon black | 10 | 3 | 0.000872% | 39% | 5 | 19 |
| Ex. 12 | \ | 10 | 3 | 0.000872% | \ | \ | 31 |
| CEx. 13 | Super P carbon black | 10 | 3 | 0.000872% | 18% | 3 | 27 |
| CEx. 14 | Super P carbon black | 10 | 3 | 0.000872% | 39% | 0.5 | 28 |

TABLE 3-continued

Conductive coating performance of each example and comparative example

| No. | Negative Electrode: Type of conductive agent | Aperture μm | Spacing mm | Hole Area Percentage | Hole Area Percentage covered by conductive agent | Thickness of conductive coating (μm) | Deposition overpotential mV |
|---|---|---|---|---|---|---|---|
| Cex. 15 | Super P carbon black | 10 | 3 | 0.000872% | 39% | 6 | 19 |

As can be seen from Table 3, by comparing Example 12 with Example 13-16, after the aluminum foil surface was coated with a conductive coating, the deposition overpotential of button battery cell had a significant drop, indicating that conductive coating was more conducive to sodium deposition, which was related to the situation that the conductive coating has more deposition active sites, and thus reduce nucleation energy required for Na deposition. The types of conductive agents in Examples 13 to 16 were different, and the percentage of the hole area covered by the conductive agents and the deposition overpotential were also different in which adopting a single-walled carbon nanotube as a conductive agent in Example 16 results in the lowest deposition overpotential, which is related to the situation that a single-walled carbon nanotube has a better conductivity and higher aspect ratio, and is beneficial to increase the coverage of perforated positions and reduce the deposition overpotential of perforated positions. When the viscosity of the slurry was too low so that the proportion of the hole area covered by the conductive agent was less than 20% (Comparative Example 13), the deposition overpotential of the button battery cell was not significantly improved, and uneven sodium deposition and even dendrites formation were readily occur in the electrode plate and more electrochemical side reactions occur with the electrolyte.

In Examples 17, 13 and 18, within the scope of the present application, the thickness of the conductive coating was gradually increased, which can effectively reduce the overpotential required for sodium deposition. When the conductive coating was too thin (Comparative Example 14), the conductive coating was difficult to cover all the current collectors, resulting in a high local nucleation energy in the uncovered area, and the effect of reducing the overall deposition overpotential was not significant. When the conductive coating was too thick (Comparative Example 15), it was not conducive to the improvement of battery cell energy density.

Example 19

(1) Preparation of positive electrode: $Na_4Fe_3(PO_4)_2P_2O_7$ material was used for a positive electrode (gram capacity 120 mAh/g), polyvinylidene fluoride (PVdF) was used as a binder, and conductive carbon black (Super-P) was used as a conductive agent. $Na_4Fe_3(PO_4)_2P_2O_7$, PVdF and Super-P were mixed in N-methylpyrrolidone (NMP) as a solvent at a mass ratio of 96%:2%:2% uniformly to prepare a positive electrode slurry. An extrusion coater was used to apply the positive slurry on the surface of an aluminum foil in a positive active material mass per unit area of 30 mg/cm$^2$ and the applied slurry was dried, and then the coated electrode plate was subjected to cold pressing in a design compression density of 2.5 g/cm$^3$ with a cold press. The prepared cold-pressed electrode plate was subjected to a laser perforation treatment.

(2) Preparation of negative electrode: a perforated aluminum foil with a thickness of 12 μm was used as a negative electrode current collector, and the negative electrode current collector was coated with a conductive coating on the surface thereof. A gravure primer coater was used to apply the conductive slurry on the perforated current collector and the applied slurry was dried to obtain the final negative electrode plate. The prepared cold-pressed electrode plate was subjected to a laser perforation treatment. The aperture and spacing of holes of the negative electrode plate for each example were shown in Table 1.

(3) Preparation of electrolyte: $NaPF_6$ was dissolved in a mixed solvent of diglyme/tetraethylene glycol dimethyl ether by volume 1:1 in a concentration of 1 mol/L to obtain electrolyte.

(4) Battery assembly: the prepared positive and negative electrode plates and separator were cut into corresponding sizes and were wound into a dry battery cell by winder, and then through welding, packaging with an aluminum plastic film, liquid injection, chemical formation, pumping, secondary packaging, capacity testing and other standard processes, a soft-packed sodium metal battery was prepared. Among them, the electrolyte is injected in a calculated amount of 4 g/Ah.

Example 20-Example 21 and Comparative Example 16

These examples were the same as example 19 with exception that the distance between positive and negative holes in the center of circle is adjusted to change the overlapping area of positive and negative electrodes, and the test results were shown in Table 4. In Example 19, the overlapping area was 5%, Example 1, Example 20, and Example 21 increased in sequence or arranged according to specific circumstances, and Comparative Example 16 was less than 5%.

The perforated aperture, hole spacing, the overlapping area of positive electrode hole and negative electrode hole and the percentage of the overlapping area in the total area of the positive electrode hole in the positive and negative electrode plates of each example and comparative example are shown in Table 4.

TABLE 4

Percentage of the overlapping area of positive electrode hole and negative electrode hole in the total area of the negative electrode hole for each example and comparative example

| No. | Positive hole aperture(μm) | Positive hole spacing (mm) | Negative hole aperture(μm) | Negative hole spacing (mm) | Distance between positive and negative holes in the center of circle (μm) | Percentage of the overlapping area in the total area of the negative electrode hole |
|---|---|---|---|---|---|---|
| Ex. 19 | 50 | 5 | 10 | 5 | 29.0 | 5% |
| Ex. 20 | 50 | 5 | 10 | 5 | 26.0 | 34% |
| Ex. 21 | 50 | 5 | 10 | 5 | 23.4 | 68% |
| CEx. 16 | 50 | 5 | 10 | 5 | 29.7 | 1% |

The complete infiltration time, battery cell capacity and capacity retention after 200 cycles of full battery of each example and comparative example were shown in Table 5.

TABLE 5

The complete infiltration time, battery cell capacity and capacity retention after 200 cycles of full battery of each example and comparative example

| No. | Complete infiltration time | Battery cell capacity Ah | Capacity retention after 200 cycles |
|---|---|---|---|
| Ex. 19 | 15 h | 509.8 | 85.20% |
| Ex. 20 | 11 h | 510.4 | 86.20% |
| Ex. 21 | 9 h | 510.7 | 87.10% |
| CEx. 16 | 87 h | 509.1 | 77.80% |

As can be seen from Table 4: by comparing Examples 19 to 21 with Comparative Example 16, when the overlapping area of the positive electrode hole and the negative electrode hole is ≥5% of the total area of the negative electrode plate hole, the higher the overlapping area proportion, the shorter the infiltration time of the flat-plate battery is, a higher the battery cell capacity can be obtained, and a better cycle stability can be maintained. When the overlapping area of the negative electrode hole and the negative electrode hole is less than 5% of the total area of the positive electrode plate hole, the infiltration time is prolonged, and the infiltration time varies greatly, resulting in a decrease in the battery cell cycle performance.

To sum up, by adopting the perforated positive and negative electrode plates to construct a vertical microporous transmission network of electrolyte, infiltration performance of a large-size flat-plate sodium metal battery can be greatly improved, complete infiltration time is greatly shortened, and the battery cell can be ensured to fully exert its capacity and to have better cycle performance.

The above is only the preferred example of the application, not in order to limit the application. Any amendment, equivalent replacement, improvement and the like included in this protection Scope can be made, without departing the spirit and principle of the application.

The invention claimed is:

1. A flat-plate type sodium metal battery, comprising a positive electrode plate and a negative electrode plate, the positive electrode plate provided with a first micro-through-hole arranged in an array on at least part of the surface thereof, the negative electrode plate provided with a second micro-through-hole arranged in an array on at least part of the surface thereof, wherein the first micro-through-hole has an aperture of from 1 μm to 100 μm;

wherein the first micro-through-hole is from the first micro-through-hole is from 1 mm to 10 mm away from its adjacent first micro-through-hole;

wherein the first micro-through-hole and the second micro-through-hole have an overlapping area of ≥5% of the total area of the second micro-through-hole of the negative electrode plate, the second micro-through-hole has an aperture of from 1 μm to 20 μm; and the second micro-through-hole is from 1 mm to 5 mm away from its adjacent second micro-through-hole.

2. The battery according to claim 1, wherein:

a ratio of an area of the first micro-through-hole to an area of the positive electrode plate is less than 1%.

3. The battery according to claim 1, wherein:

a ratio of an area of the second micro-through-hole to an area of the negative electrode plate is less than 0.1%.

4. The battery according to claim 1, wherein the positive electrode plate comprises a positive active material, and the positive active material is at least one of sodium transition metal oxide, polyanionic compound, and Prussian blue compound.

5. The battery according to claim 1, wherein the negative electrode plate comprises a porous current collector and a conductive coating coated on at least part of the surface of the porous current collector.

6. The battery according to claim 5, wherein:

(1) the conductive coating has a thickness of from 1 μm to 5 μm;

(2) a ratio of an area of the conductive coating to a pore area of the porous current collector is ≥20%;

(3) the conductive coating comprises a conductive agent and a binder, and the conductive agent is present in the conductive coating in a mass percentage content of from 10% to 80%;

(4) the conductive coating comprises a conductive agent and a binder, and the conductive agent comprises at least one of conductive carbon black, graphite, carbon fiber, single-walled carbon nanotubes, multi-walled carbon nanotubes, graphene, and fullerenes; and/or (5) the conductive coating comprises a conductive agent and a binder, and the binder is at least one of polyvinylidene fluoride, sodium carboxymethyl battery cellulose, styrene-butadiene rubber, sodium alginate, lithium polyacrylate, sodium polyacrylate, polytetrafluoroethylene, polyimide, and polyurethane.

7. The battery according to claim 1, wherein the battery further comprises a separator wherein, (1) the separator comprises at least one of polypropylene microporous films, polyethylene microporous films, polyimide microporous films, and polyethylene terephthalate microporous films; and/or (2) the separator has a thickness of from 5 μm to 15 μm.

8. The battery according to claim 1, wherein the positive electrode plates and negative electrode plates are prepared by laser drilling, mechanical punching or a combination thereof.

9. The battery according to claim 1, wherein the battery has a battery cell in a flat-plate structure, the battery cell has a length and width of from 400 mm to 1600 mm, the battery cell has a thickness of from 10 mm to 40 mm, a ratio of the length and the width of the battery cell is (1.1~3.9):1, and a ratio of the length to the thickness of the battery cell is (10~150):1.

10. An electrochemical device, comprising the battery according to claim 1.

* * * * *